Sept. 25, 1956  G. E. MITCHAM  2,764,182
CONTROL MEANS FOR OPERATING A PILOT DEVICE
Filed June 28, 1951  3 Sheets-Sheet 1

GEORGE E. MITCHAM,
By Wilkinson & MacKenney
ATTYS

Sept. 25, 1956 G. E. MITCHAM 2,764,182
CONTROL MEANS FOR OPERATING A PILOT DEVICE
Filed June 28, 1951 3 Sheets-Sheet 2
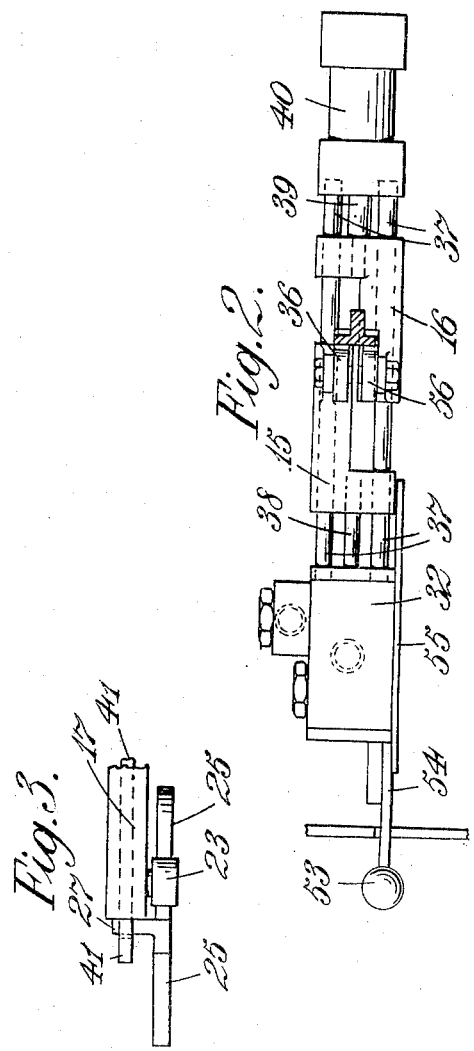
GEORGE E. MITCHAM,
By
Wilkinson & Mawhinney
ATTYS.

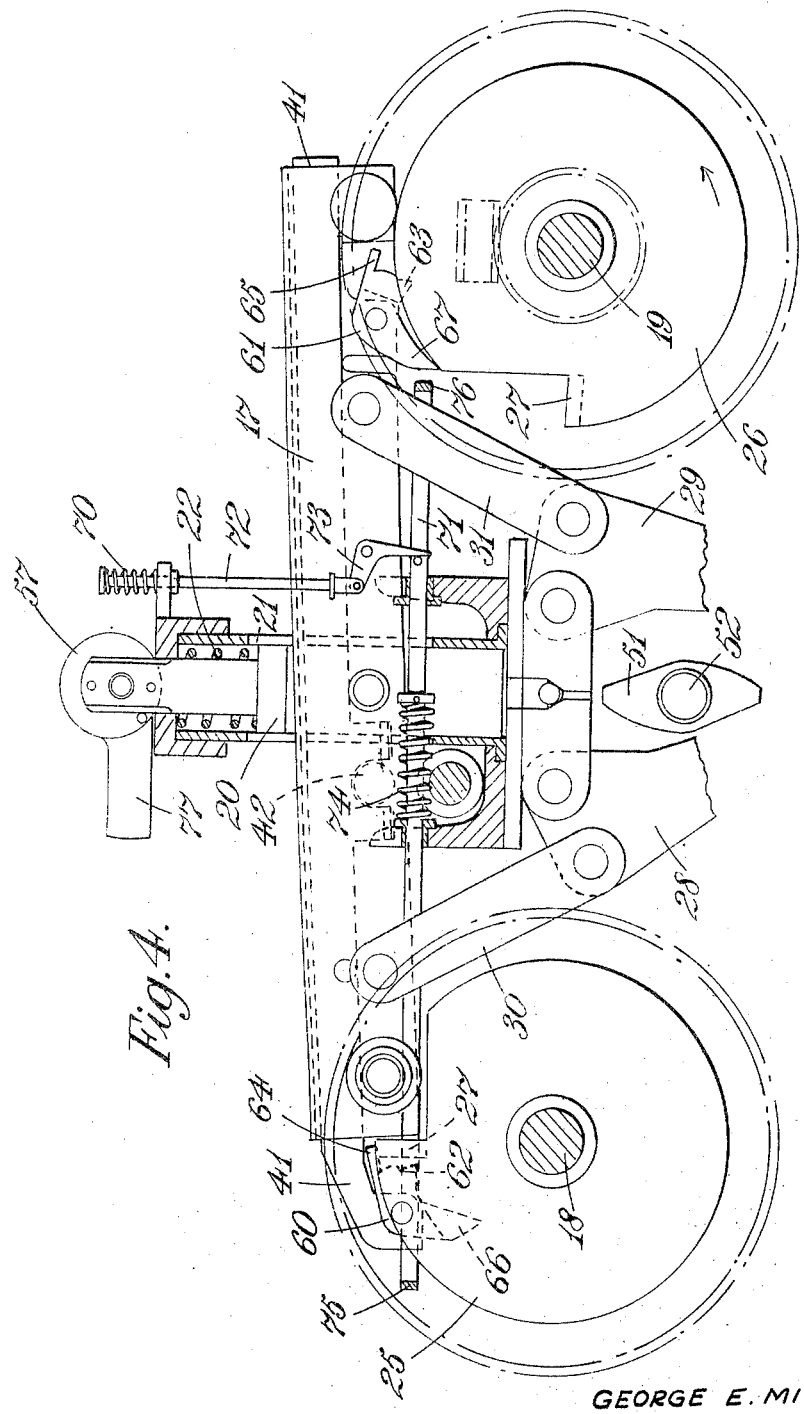

United States Patent Office 2,764,182
Patented Sept. 25, 1956

2,764,182

**CONTROL MEANS FOR OPERATING
A PILOT DEVICE**

George Ernest Mitcham, London, England, assignor to Humphreys & Glasgow Limited, London, England, a British company Application June 28, 1951, Serial No. 234,108

Claims priority, application Great Britain July 19, 1950

16 Claims. (Cl. 137—634)

This invention relates to means for controlling a cycle of operations in a plant or installation.

More particularly it relates to a novel construction forming a unit in an automatic operator for such purpose which itself absorbs little power and which is compact and light in structure.

An automatic operator according to the invention may comprise only one such unit but generally would comprise an associated group of synchronized units and in this latter form is particularly suitable for controlling the movement of the valves of a water-gas plant.

This invention consists in means for operating pilot valves or relays controlling the sources of power for effecting a cycle of operations in a plant or installation characterized in that the pilot valve or relay is operated by a beam impelled by pressure whereby at or near each end it is urged into contact with the profile of one of an interconnected pair of rotating cams so that either end is constrained to follow the profile of the cam upon which it is supported, the arrangement being such that movement of either end of the beam in a direction towards the axis of its supporting cam serves to operate the pilot valve or relay, and resetting of the beam by movement of either end in a direction away from the axis of its supporting cam does not operate the pilot valve or relay.

Preferably only one pilot valve or relay is operated by any one beam, movement of one end of the beam towards the axis of its supporting cam serving to operate the pilot valve or relay in one sense only and movement of the other end of the beam towards the axis of its supporting cam serving to operate the pilot valve or relay only in the opposite sense.

Conveniently the pressure to urge the beam at or near its ends into contact with the cams is provided by spring loading of the beam at any point or points along its length but preferably at or near its centre, and a system of levers, for instance a pair of pivoted bell-crank levers linked to the beam one either side of its centre, may be used to transmit to the pilot valve or relay the movements of the ends of the beam towards the axes of their respective supporting cams.

Re-setting of the beam by movement of either end in a direction away from the axis of the cam supporting that end preferably follows automatically upon completion of the plant operation initiated by the preceding movement of the pilot valve or relay, being independent of the means operating the beam-supporting-cams and being effected by a re-setting device operated by power automatically applied upon completion of the said plant operation. The re-setting device may move the beam through the agency of the same system of levers serving to transmit the control movements of the beam to the pilot valve or relay, for instance by movement of the corresponding one of the above mentioned bell-crank levers.

In order to use fully the advantages of lightness of structure and compactness offered by the invention the pilot valve or relay is conveniently one that absorbs little power. It may be an electrical relay but is preferably a pneumatic or hydraulic valve.

The preferred arrangement is also such that failure by either end of the beam to move towards the axis of its supporting cam in response to the profile of the same cam, or failure in proper resetting of the beam after that movement as a result either of non-completion of the desired plant movement or failure in the resetting device results in the controlled plant or installation being automatically set in a safe condition.

Thus the safe setting of the plant may result from actuation of a trip lever by a lock bar engaged as a result of the continued rotation of the cam towards the axis of which one end of the beam has moved. The lock bar may slide within the beam which is suitably shaped for that purpose and be provided with working faces, for instance on latches, for engagement with side extensions provided for that purpose on the cams.

Such an arrangement is illustrated and described later herein.

Also as described the beam may be pivotally mounted at or near its centre in a piston sliding within a fixed cylinder, the ends of the beam being urged into contact with the supporting cams by pressure exerted upon the piston against the action of a fluid within the cylinder so that movement of either end of the beam towards the axis of its supporting cam is cushioned or retarded. The fluid in the cylinder is preferably air and in the example described and illustrated pressure upon the piston is provided by a spring.

An automatic operator according to the invention may comprise a single unit of one beam associated with a pilot valve or relay or relays and an interconnected pair of cams or it may comprise an associated group of such units which are combined for operation in concert, for example by mounting the cams on a pair of cam shafts common to all the beams. An interlocking mechanism may be provided to prevent operation, either automatic or manual, in other than the desired sequence.

Preferably means are also provided for arresting the beam and thus isolating it from the action of the cam.

Such isolating means may act upon one beam only or may be adapted to act simultaneously upon a number of associated beams.

Alternative or additional forms of beam arresting means may be included and conveniently in an associated group of beams one form of arrester is provided to act simultaneously upon the associated group of beams and another form is fitted to each beam for individual arresting.

In that form of controller where the beam is linked to a pair of pivoted bell-crank levers for transmitting its movements to the pilot valve or relay the said beam arresting means may for instance comprise a cam-shaft and cam, movable to hold the bell-cranks spaced apart and so to prevent either end of the beam from moving towards the axis of its supporting cam.

Such a form of beam-arresting means is convenient for use for simultaneous action upon all of an associated group of beams.

To adjust the timing of the sequence of plant operations provision may be made for altering the setting of a beam-supporting cam relative to that of any other such cam with which it is coupled or associated.

The nature of this invention and means for carrying it out will be appreciated from the following description of an example, reference being made to the accompanying drawings, of which, Figure 1 is a diagrammatic side elevation (partly in section) showing one unit of an automatic operator for controlling the performance of a series of operations in a plant or installation in a predetermined sequence.

Figure 2 is a plan on the line 2—2 of part of Figure 1,

Figure 3 is a diagrammatic plan of a detail, while

Figure 4 is a side elevation, partly in section showing a form of mechanism for safe-setting of the plant in the event either of failure of a beam end to move towards the axis of its supporting cam in response to the profile of that cam or of failure in operation of the beam resetting means.

Figure 1:
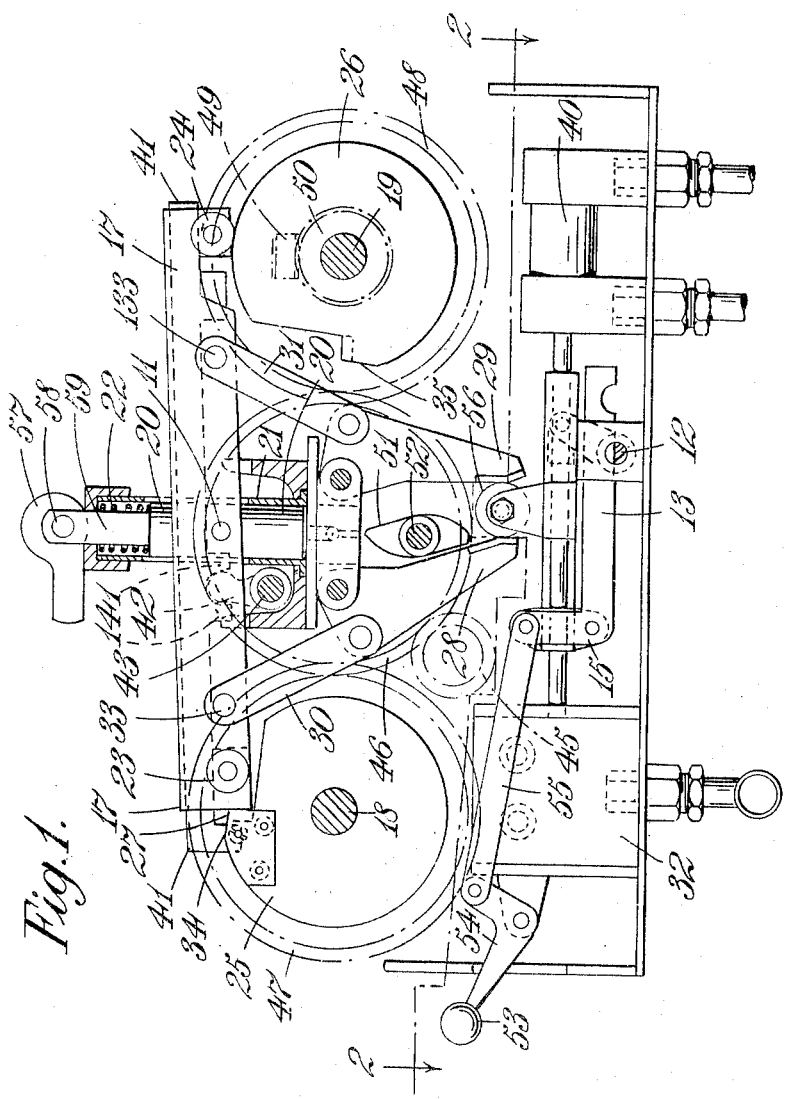

The automatic actuation or control of a particular unit such as a valve in the plant is effected by a pilot valve 32 and when the desired operation in the plant has been successfully completed, power is automatically applied to a resetting device 40. The pilot valve and the resetting device are both shown as pneumatic or hydraulic devices in this example. The periodic actuation of the pilot valve or relay is controlled by a shaped beam 17 the beam being pivoted on a pivot 11 mounted in a piston 20 movable in the cylinder 21 and controlled by a helical spring 22 adapted to urge the piston 20 downwardly within its fixed cylinder 21, forming a fluid containing dash pot. The beam 17 carries tappet rollers 23 and 24, near each end. The tappet rollers are arranged to engage at proper times with the peripheries of their cams 25 and 26 mounted respectively on cam shafts 18 and 19 common to any desired number of such beam operating cams. The cams are caused to rotate through the driving pinion 45 engaging with a central large spur wheel 46 in constant engagement with two spur wheels 47 (driving cam shaft 18) and 48 (driving cam shaft 19). Adjustment of the setting of all cams on shaft 18 relative to those on shaft 19 may be effected by disengagement of the spur wheel 47 and re-engagement after the necessary rotation of one or other of the shafts. In addition, to enable fine setting of a cam relative to any other on either shaft it may have a worm 49 engaging a worm wheel 50, one of those two parts being in constant positive connection with the cam shaft 19 and the other with the cam 26. In the "set" position of the beam, each of the tappets 23 and 24 is pressed into contact with the working face of the corresponding one of the interconnected pair of cams 25 and 26, the pressure on the beam as a whole being effected by the spring 22 through the pivot 11, and the movement of either end of the beam 17 towards the axis of the cam upon which it is supported is transmitted to the pilot valve or relay 32 by the corresponding one, say 28, of a pair of pivoted bell-crank levers 28 and 29 of which 28 is linked to the beam by link 30 and 29 is linked to the beam by link 31; each link engages the beam at a pivot 33 or 133 and the bell-crank levers 28 and 29 lie on either side of the pivot 11. The operation of the pilot valve or relay 32 is effected by a rod 38 connected to a rider 15 slidable to and fro on the guide bars 37 and carrying a wheel 56 adapted to engage with the lower inner faces of the bellcrank levers 28 and 29. When the end of the beam 17 nearest to the cam 25 drops into the cam gash the lower end of the bell-crank 28 is pushed to the right and correspondingly pushes the rider 15 to the right, thus actuating the pilot valve or relay. The resetting of the beam is effected automatically upon completion of the desired plant operation, power being supplied to the resetting device 40, when such operation has been completed, in such a way as to urge to the left the rod 39 connected to the rider 16 which is also movable on the guide bars 37 and urges a wheel 56 attached to the rider 16 to the left thereby raising the end of the beam 17 by way of the bell-crank lever 28 and link 30.

The cam 25 carries a lateral extension 27 (see Figure 3) which normally lies close to the end of the beam 17 when it is in the cam gash, and to soften the fall of the tappet 23 into the cam gash and to prevent a hammer blow of the lower end of the bell-crank lever 28 or 29 on the wheel 56 the cam is eased off just before the drop as shown at 34, and at 35.

A lock bar 41 is disposed within the beam 17 and is longitudinally movable therein. It has one face adapted to engage with the extension 27 on the cam 25 and another for engagement with the corresponding extension on cam 26 and has also two lugs 141 which engage with the rounded end of a short trip lever 42 mounted on a shaft 43, a small angular rotation of which triggers a mechanism which shuts down all the operations in the plant and sets all the plant in a safe condition. The cams 25 and 26 rotate very slowly and the action of the extension 27 is as follows. If the resetting device 40 operates quite normally the bell-crank lever 28 is moved to the left, raises the corresponding end of the beam 17 and carries the locking bar 41 clear of the extension 27 of the cam 25. However, if the plant operation was not successfully completed, or if, for any other reason, the resetting device 40 fails to operate, the beam with the locking bar 41 is not raised clear of the extension 27 and by the continued rotation of the cam 25, the locking bar 41 is moved longitudinally within the beam 17, trips the lever 42 and shuts down the apparatus.

It will be understood that the operation of the cam 26 is similar in its turn to that of cam 25 and operates through the bell-crank lever 29 to move the pilot valve in the opposite direction.

It will also be understood that if necessary the beam tappets or rollers (23, 24) may be duplicated. In that case the supporting cams (25, 26) may each be a single broad cam providing tracks for a pair of tappets on opposite faces of the beam, or be constructed of two thin identical cams joined by a spacing piece to form in effect one broad cam with two identical synchronized tracks.

The two bell-crank levers 28 and 29 and the beam 17 can be held out of action by a lozenge-shaped cam 51 mounted on a shaft spindle 52 which can be turned by hand to an angle of 90° from the position shown in Figure 1, and the pilot valve 32 may then be operated by hand through handle 53, bell-crank lever 54, and link 55.

To safeguard the plan against operation other than in the desired sequence when more than one pilot valve is involved, and particularly when movement of the said pilot valve is being effected by means of the hand levers, it is desirable to have an interlock between the pilot valves. For this purpose, when three beam units (only one of which is shown in Figure 1) are to be operated in combination, a bar 12 of circular cross section which is slotted transversely is coupled by an arm with the rider 15 of the middle one of the three pilot valves, so that it is rotated about its axis when that pilot valve is operated by the corresponding beam or by the corresponding hand lever. The rotating bar 12 is at right angles to the guide bars 37 and is so placed as to engage with either of the two sliding bars 13 (only one shown in Figure 1) which are suitably notched and coupled each to one of the riders 15 of the other two pilot valves and which are arranged to move in a direction parallel to the guide bars 37 in concert with the operation of the corresponding pilot valve by its beam or hand lever. Therefore, only when the middle of the three pilot valves is in such a position that the transverse slotting in bar 12 is uppermost, is it possible for either of the other two pilot valves to be moved from a position in which the notch in its bar 13 is coincident with the bar 12.

Such locking devices are not limited to any number of pilot valve mechanisms.

It will be seen that rotary movement of shaft 52 may be arranged to shut down a number of pilot valve controlling means simultaneously while the cam lever 57 when rotated clockwise on the pivot 58 will lift the rod 59 and the beam by its pivot 11 against the force of the spring 22 so that the beam no longer engages the cams 25 and 26 and will shut down only that pilot valve controlling means to which it is attached.

Referring to Figure 4 the latches 60 and 61 pivoted to the lock bar 41 provide working faces for engagement with the side extension 27 on the cams 25 and 26. The latches are pivoted with light friction loading so that they do not swivel freely but remain in that position in which for the time being they are set.

When by resetting, one end of the beam 17 is raised from the cam gash the slide extension 27 of the anti-clockwise rotating cam, say 26, encounters tail 67 of the latch 61 and moves the latch into the position shown for 61 in Figure 4 where it then presents a leading edge 63 in the path of the cam side extension 27. If when next encountering the cam gash the end of the beam fails to enter it a lock bar 41 would then be operated to trip lever 42 and set the controlled plant or apparatus in a safe condition.

On the other hand failure in automatic resetting of the beam after its response to the cam profile likewise results in a safe-setting of the plant or apparatus, the latch, on response of the beam end to the cam gash, being lifted into the position shown for 60 in Figure 4 by pressure of its longitudinal extension 64 (65 in the case of latch 61) upon the cam side extension 27. The leading edge 62 may then engage with the slide extension 27 to move the lock bar 41 and operate the trip lever 42.

As described above, owing to the friction between a latch and its pivot, when its end of the beam is normally reset latch 60 will remain in the "tail-down" position shown until by continued rotation of cam 25 it is moved into the "tail-up" position shown for latch 61. Thus engagement of a latch with the cam side extension immediately following normal resetting of a beam is avoided.

It is apparent that means should also be provided for rendering the latches inoperative when a beam is arrested, for manual operation or other reason, and one form of such means is also illustrated in Figure 4. Thus when the beam 17 is arrested by clockwise rotation of cam 57 the spring 70 is compressed by projection 77, and the bar 71, held in the position shown in Figure 4 by rod 72 and lever 73 against the action of another spring 74, slides to the right. Side extensions 75 and 76 of the bar 71 engage with the tails 66 and 67 of the latches 60 and 61 respectively so raising the leading edges 62 and 63 clear of the paths of the cam side extensions 27.

It follows that the spring 74 must be sufficiently light in action to permit the cam side extensions 27 to compress it and pass by the latch tails without moving the lock bar 41 and trip lever 42.

Arrest for instance by the means 51, 52 of a group of associated beams for manual operation of the plant could be accompanied or followed by the stopping of cam-shafts 18 and 19 to avoid interference by the latches in manual operation.

I claim:

1. Control means adapted to operate a pilot device controlling a source of power for effecting a cycle of operations in a plant comprising actuating means comprising an interconnected pair of rotating cars, means for rotating the cams, a movable beam, and loading means urging the ends of said beam into contact with the profiles of said cams, whereby each end of the beam is moved towards the axis of its associated cam, transmission means operatively connected to the beam and adapted to transmit the movement of each end of the beam to the pilot device, and re-setting means operatively connected to said beam for moving either end of said beam away from the axis of the associated cam and adapted to be operatively free of the pilot device so that operation of the re-setting means will not operate the pilot device.

2. Control means as claimed in claim 1 in which said loading means comprises spring means.

3. Control means as claimed in claim 1 in which said transmission means and re-setting means include a common linkage connected to the beam.

4. Control means adapted to operate a pilot device controlling a source of power for effecting a cycle of operations in a plant comprising actuating means comprising an interconnected pair of rotating cams, means for rotating the cams, a movable beam, and loading means urging the ends of said beam into contact with the profiles of said cams, whereby each end of the beam is moved towards the axis of its associated cam, transmission means operatively connected to said beam and adapted to be operatively connected to the pilot device, whereby the movement of one end of the beam is adapted to operate the pilot device in one sense and the movement of the other end of the beam is adapted to operate the pilot device in the opposite sense.

5. Control means as claimed in claim 1 in which safe-setting means adapted to set the plant in a safe condition is provided and comprises a movable trip member associated with said beam and adapted to be operatively connected to the plant, and abutment members carried by the cams and engageable with the trip member so as to move it on failure of either end of the beam to follow the profile of the associated cam.

6. Control means as claimed in claim 1 in which safe-setting means adapted to set the plant in a safe condition is provided and comprises a movable trip member associated with said beam and adapted to be operatively connected to the plant, and abutment members carried by the cams and engageable with the trip member so as to move it on failure of either end of the beam to be moved away from the axis of the associated cam by said resetting means.

7. Control means as claimed in claim 1 in which means are provided for moving the ends of the beam out of contact with the cam profiles.

8. Control means for use with pilot devices controlling the sources of power for effecting a cycle of operations in a plant, comprising an actuating means adapted to be operatively connected to each pilot device, each actuating means comprising an interconnected pair of rotatable cams, means for rotating the cams, a movable beam, and loading means urging the ends of said beam into contact with the profiles of said cams, an operating device adapted to be connected to the pilot device, transmission means between the beam and the operating device for transmitting movement of each end of the beam towards the axis of the associated cam to the operating device, re-setting means, and a transmission between the re-setting means and the beam for moving either end of the beam away from the axis of the associated cam without operating the operating device.

9. Control means as claimed in claim 8 in which interlocking means are provided operatively connecting the operating devices to one another, said interlocking means comprising lock means for holding one operating device against movement and release means for releasing said lock means, which release means is operatively connected to another of the operating devices, whereby movement of said another operating device releases the first-said operating device for movement and operation of the pilot devices in other than the desired sequence is prevented.

10. Control means as claimed in claim 8 in which two cam shafts are provided, one shaft carrying one cam of each pair of cams and the other shaft carrying the other cam of each pair of cams.

11. Control means for use with a pilot device for controlling a source of power for effecting an operation in a plant, comprising actuating means adapted to be operatively connected to the pilot device and comprising an interconnected pair of rotatable cams, means for rotating the cams, a beam, a movable carrier pivotally supporting said beam adjacent its centre, and loading means acting on said movable carrier and urging the ends of said beam into contact with the profiles of said cams, operating means adapted to be connected to the pilot device, transmission means between the beam and the operating means for transmitting movement of each end of the beam towards the axis of the associated cam to the operating means, re-setting means, and a transmission between the re-setting means and the beam for moving either end of the beam away from the axis of the associated cam without operating the operating means.

12. Control means as claimed in claim 11 in which said movable carrier comprises a piston and a fixed cylinder having fluid therein is provided within which said piston slides, the aforesaid loading means acting on the piston against the pressure of the fluid within the cylinder, thereby cushioning movement of either end of the beam towards the associated cam axis.

13. Control means as claimed in claim 12 in which said transmissions include a common linkage which comprises two bell-crank levers associated with the operating means, pivots carrying said levers, which pivots are mounted on a fixed part of the apparatus, and a pivoted link connecting each lever with the beam, one lever and one link being provided on each side of the center of the beam.

14. Control means adapted to operate a pilot device controlling a source of power for effecting an operation in a plant comprising cam means, means for rotating said cam means, a movable member, means for holding the opposite ends of said member in contact with said cam means, whereby the opposite ends of said member are alternately moved towards the axis of said cam means, means operatively connected to the ends of said member and adapted to transmit the movements of the ends of said member selectively to the pilot device for moving the pilot device selectively in opposite senses, and re-setting means operatively connected to said member for moving the ends of the member away from the axis of said cam means.

15. Control means for use with at least two pilot devices controlling the sources of power for effecting a cycle of operations in a plant, comprising a pair of rotating cams, a movable beam, loading means urging the ends of said beam into contact with the profiles of said cams, whereby each end of the beam is moved towards the axis of its associated cam, transmission means operatively connected to said beam and adapted to be operatively connected to the pilot devices, whereby the movement of one end of the beam towards the axis of its associated cam is adapted to operate one of the pilot devices and the movement of the other end of the beam towards the axis of its associated cam is adapted to operate the other of the pilot devices, and re-setting means operatively connected to said beam for moving either end of the beam away from the axis of the associated cam and adapted to be operatively free of the pilot devices so that operation of the re-setting means will not operate the pilot devices, the pilot devices adapted to be automatically reset at a preselected time independent of the re-setting movement of the beam.

16. The combination of a pilot device controlling a source of power for effecting a cycle of operations in a plant with a control means for the pilot device comprising an interconnected pair of rotating cams, a single movable beam having its opposite ends loaded into contact with the profiles of said cams, whereby each end of the beam is moved towards the axis of its associated cam, transmission means operatively connected to the beam transmitting the movement of each end of the beam to the pilot device, and re-setting means operatively connected to the beam for moving either end of the beam away from the axis of the associated cam and operatively free of the pilot device so that operation of the re-setting means will not operate the pilot device.

References Cited in the file of this patent

UNITED STATES PATENTS

| 1,677,102 | Taussig | July 10, 1928 |
| 1,841,340 | Stelfox | Jan. 12, 1932 |
| 1,877,722 | Rawson | Sept. 13, 1932 |
| 2,553,250 | Gross | May 15, 1951 |

FOREIGN PATENTS

| 38,724 | Denmark | Apr. 30, 1928 |